United States Patent [19]

Sealey et al.

[11] Patent Number: 4,554,831

[45] Date of Patent: Nov. 26, 1985

[54] ARRANGEMENT AND METHOD FOR LIQUID LEVEL MEASUREMENT

[75] Inventors: Graham P. Sealey, Auckland; Andrew C. Corney, Wellington, both of New Zealand

[73] Assignee: Tru Test Distributors Limited, Auckland, New Zealand

[21] Appl. No.: 567,320

[22] Filed: Dec. 30, 1983

[30] Foreign Application Priority Data

Aug. 4, 1982 [NZ] New Zealand .................. 201498

[51] Int. Cl.[4] ............................................. G01F 23/28
[52] U.S. Cl. .................................... 73/304 R; 340/620
[58] Field of Search ..................... 73/304 R, 290 R; 324/207, 208; 340/620; 200/61.05; 336/138, 75

[56] References Cited

U.S. PATENT DOCUMENTS 3,722,281  3/1973  Marsh .............................. 73/304 R
3,755,804  8/1973  Johnson ........................... 73/304 R
4,125,021  12/1978  Kamei et al. .................... 73/304 R

FOREIGN PATENT DOCUMENTS 3005489  8/1981  Denmark ......................... 73/403 R

*Primary Examiner*—Charles Frankfort
*Assistant Examiner*—Thomas B. Will
*Attorney, Agent, or Firm*—Holman & Stern

[57] ABSTRACT

The invention relates to (1) an arrangement and (2) method for the measurement of the level of an electrically conductive liquid. In a preferred form of the invention the liquid is milk provided within a suitable container. The arrangement includes at least two spaced apart electrodes and an elongate coil which are at least partially immersed in the electrically conductive liquid. Means are provided for passing an alternating current through and between the first and second electrodes, by way of the electrically conductive liquid. This forms or creates an electro-magnetic field about the first electrode which is then picked up by and current induced in the coil. Means are provided to convert and read the electro-magnetic field into a substantially linear function (current) of the level of the electrically conductive liquid. The method includes at least partially immersing at least two electrodes and one elongate coil in an electrically conductive liquid. An alternating current is then passed through and between the first and second electrodes by way of the electrically conductive liquid. This then forms an electro-magnetic field about at least one of the electrodes. The electro-magnetic field is picked up by and current induced in the coil. The electro-magnetic field is then converted into a substantially linear function (current) of the level of the electrically conductive liquid.

16 Claims, 5 Drawing Figures

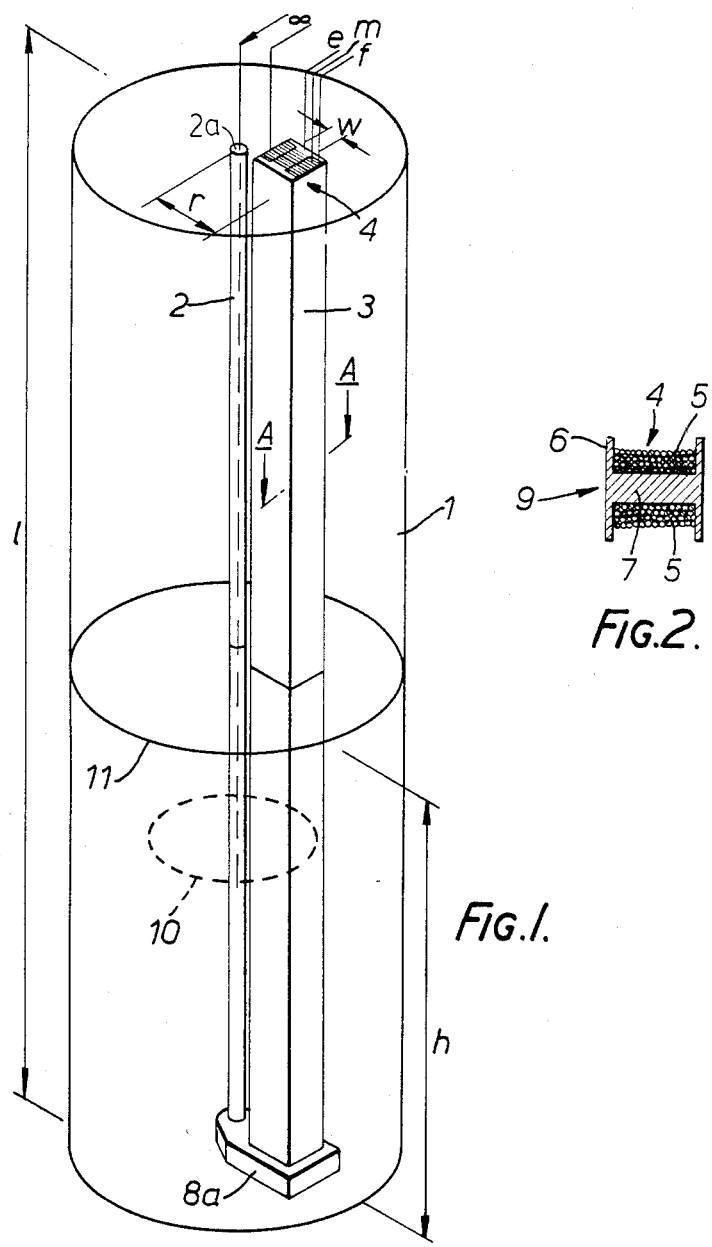

ARRANGEMENT AND METHOD FOR LIQUID LEVEL MEASUREMENT

BACKGROUND TO THE INVENTION

This invention relates to an arrangement and a method for liquid level measurement. The invention has particular, although not sole application, to the measurement of levels of electrically conductive liquids such as milk. The invention does however have application to the measurement of all electrically conductive liquids.

Up until this time, a number of mechanically passive arrangements and methods have been used and suggested for measuring liquid levels, such as including capacitance probes, relative conductivity, incremental probe using multiple electrode arrangements, ultrasonic reflection and resonant cavity methods and the like.

In the measurement of the levels of liquids such as for example milk, it is required to have an accurate and relatively low powered system for measuring the level of milk, preferably within a container. For example a measuring container or chamber associated with a milk meter, such as that described in U.S. Pat. No. 3,349,617.

The measurement of such milk is required in association with sampling as is required in milking operations, in milking sheds in dairy factories and the like.

Up until this time, none of the arrangements or methods used or known up until this time have been satisfactory, adequate or successful in allowing for the effective measurement of liquids such as milk.

For example, the capacitance probe arrangements have suffered from problems with hygiene and cleaning, in that cumulative contamination or build up on the dielectric material of the probes, has caused increasing measurement errors, with sustained or increasing use. The relative conductivity system suggested, while suitable for measurement of limited accuracy, has been shown to be seriously effected by variations in conductivity of liquid, (such as is commonly experienced with liquids such as milk).

An incremented probe arrangement using multiple electrodes, has been satisfactory with some liquids, but suffers from increase of measurement errors with time with organic liquids such as milk, because of the difficulty in keeping the electrodes clean.

The ultrasonic reflection and resonant cavity methods have been shown to be unsuitable because of their relatively high power requirements and usually relatively large size. This is a particular disadvantage where measuring arrangements and methods are to be used in milking sheds, dairy factories and the like, where it is desired to minimise expense, power use and the size of equipment and components.

The present invention sets out to provide an arrangement and method for the measurement of liquid levels, and to go someway to at least reducing these problems. The present invention also sets out to provide an efficient and straight forward measuring arrangement and method for use with liquids.

SUMMARY OF THE INVENTION

According to one aspect of this invention, there is provided a liquid level measuring arrangement comprising:
at least first and second spaced apart electrodes;
at least one elongate coil;
said electrodes and said coil being adapted to be at least partially immersed in an electrically conductive liquid;
means being provided to pass an alternating current through and between said first and second electrodes by way of said electrically conductive liquid, so as to create an electro-magnetic field about at least said first electrode;
said elongate coil being so formed that said electromagnetic field is picked up by and current induced in, said coil;
means being provided to convert said electro-magnetic field into a substantially linear function (current) of said electrically conductive liquid.

According to a further aspect of this invention, there is provided a method of measuring liquid level, including:
at least partially immersing at least first and second electrodes and at least one elongate coil in an electrically conducted liquid;
passing an alternating current through said first and second electrodes by way of said liquid, so as to create an electro-magnetic field about at least said first electrode and so as to induce said electro-magnetic field in said coil; converting said electro-magnetic field into a substantially linear function of said electrically conductive liquid.

BRIEF DESCRIPTION OF THE DRAWINGS

This invention will be described by way of example only and with reference to the accompanying drawings wherein:

FIG. 1: is a view of a liquid container including the measuring arrangement of the present invention.

FIG. 2: is a sectional plan view along the lines A—A of FIG. 1 of the accompanying drawings, showing a former and windings of one electrode.

DETAILED DESCRIPTION OF THE EMBODIMENT

Figure 3:
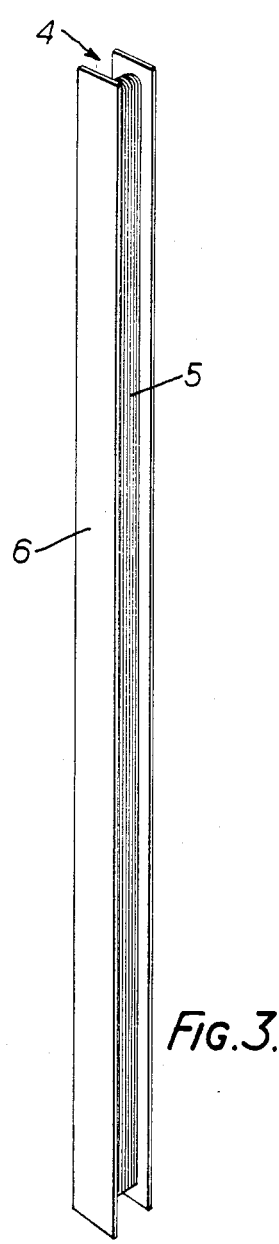
FIG. 3: is a view of a coil according to one form of the present invention.

In describing the invention with reference to the accompanying drawings, it should be appreciated that the invention is described by way of example only, with reference to the measurement of liquid within a container, being the measurement of milk within a measuring container. As indicated hereinbefore, this is by way of example only however, and the invention has equal application to the measurement of other liquids (and indeed liquids which need not necessarily be in a container).

The measuring arrangement of the present invention relates to the measurement of milk in a container associated with a suitable milk meter or some other arrangement from which milk passes into the container. The invention is particularly advantageous where it is desired to obtain a measured sample of milk, such as for testing. This is for example required in many countries, such as New Zealand, the United States of America, and many countries in Europe. By way of example, the present invention can be utilised in conjunction with a milk meter such as that described in U.S. Pat. No. 3,349,617.

The container or chamber 1 is preferably an elongate chamber formed of an appropriate insulating material such as for example a plastics material. The container is preferably closed at its lower end and is elongate in formation. Means are provided for passing an amount of milk into the container for measurement.

As shown in the accompanying drawings, at least two spaced apart, elongate, first and second electrodes 2, 3, extend into the container 1 and preferably (usually with the major axis substantially parallel to the vertical axis of the container) extend substantially the length thereof. In the form of the invention shown in the accompanying drawings, the electrodes 2, 3, are substantially parallel one to the other, but this is not essential. For ease of location, the electrodes 2, 3, (and the coil to be described hereinafter) are preferably combined into a transducer unit 8, being provided with end stop members 8a at the top and bottom thereof, which securely hold the first and second electrodes in position relative to each other, and are capable of being located securely within the container.

The electrodes 2, 3, are preferably formed of an appropriate material, such as for example stainless steel, which has particular advantage in the dairy industry, and in particular where liquid such as milk is to be measured. Electrodes constructed of a stainless steel material are able to be kept reasonably clean which is of course most important and advantageous when the arrangement of the invention is being used to measure milk, in association with milking equipment used on farms, and in milk processing environments.

The first elongate electrode 2 is in the form of a tube or rod. The second spaced apart electrode 3 can be of any desired shape and configuration, but in the preferred form of the invention is of an elongate tubular form, of a substantially square cross-section. This is however by way of example only.

In the preferred form of the invention, the second electrode 3 is substantially hollow, and houses or locates therewithin, an elongate coil 4.

The coil 4 of the present invention is in the preferred form of the invention located within and relative to the second electrode 3. It is however not essential that it be associated with the second electrode. This has been found advantageous from a manufacturing and operational point of view, but it is envisaged that the coil 4 can be provided in any particular location within the container, so long as the coil 4 is adjacent to the first electrode 2, so that the coil 4 is able to pick up and have induced current therein from an appropriate magnetic field formed about the first electrode. This will be further described hereinafter.

Thus, while the present invention describes the coil 4 as being located within the second electrode 3, the coil 4 can be located separately of the first and second electrodes 2, 3, in any particular or convenient manner, so long as the coil 4 is adjacent to the first electrode 2, and is in a form, position and location, sufficient to pick up and have induced therein, the electro magnetic field and associated current respectively created about the first electrode 2.

In the present form of the invention, the coil 4 is an elongate coil, including one or more elongate longitudinal windings 5. It has been found in experimentation, that by having a coil 4 including one or more longitudinal windings, the coil is able to pick up a particularly effective electro-magnetic field and have induced therein, a current which is capable of being converted into a linear function of the liquid level into which the electrodes 2, 3 and coil 4 extend.

The coil 4 of the present invention can include any number of elongate and longitudinal windings 5. Reference is made to the accompanying drawings and in particular to FIGS. 2 and 3 thereof. In the present invention therefore, the coil 4 includes a plurality of elongate longitudinal windings 5 which are wound about a substantially "H" shaped former 6, the windings extending about the elongate cross-bar or web 7 (ends) of the former. This then results in a coil 4 including a plurality of elongate longitudinal windings 5 extending about the former, such as for example shown in FIGS. 2 and 3 of the accompanying drawings.

The coil 4 is then able to be housed and located within the hollow elongate second electrode 3, which is capable of being sealed therein in a substantially sealed and watertight manner, by the addition of appropriate blocking and sealing materials and/or by using end stop members 8a, thus combining the electrodes and coil into a transducer unit 8. As will be appreciated from FIGS. 1 and 3 of the drawings, the coil 4 once located within the second electrode 3 within the container 1, is located in a substantially vertical and upright, plane.

Figure 4:
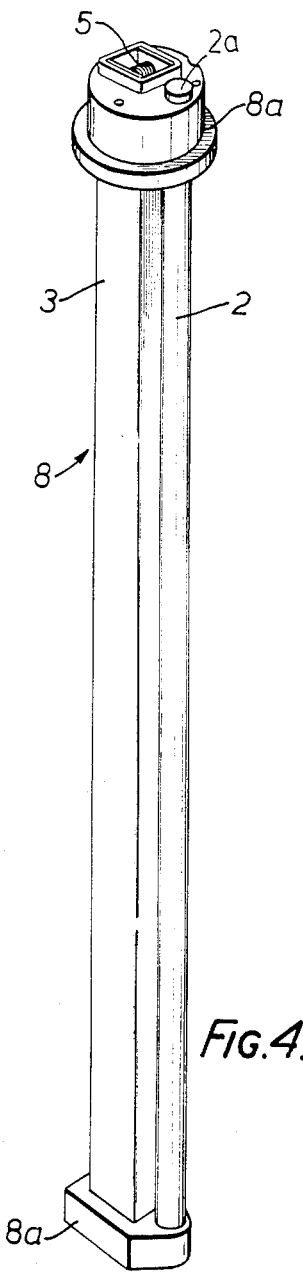
FIG. 4: is a view of a transducer unit including the electrodes and coil of the present invention.

The upper end 2a of the electrode 2 is exposed through the end stop members so as to be capable of being connected to a source of alternating current. The end stop members 8a which can for example be formed of an appropriate plastics or insulating material, have the remaining ends of the electrodes sealed or contained therein. By way of example reference is made to FIG. 4 of the accompanying drawings.

In use, appropriate known means are provided and connected to the transducer unit 8 and the electrode 2 so as to pass an alternating current through the first electrode 2. The alternating current then passes through the electrically conductive milk and through the second electrode 3.

The alternating current creates an electro-magnetic field 10 about and relative to the first electrode 2, such as shown in the accompanying drawings. The electro magnetic field 10 is in a substantially horizontal orientation or plane. The electro-magnetic field 10 created about the first electrode 2 is then picked up by, and induced in, the coil 4, to then be converted by appropriate known means, into a current of substantially linear function of the depth of the electrically conductive milk.

In use, the electro-magnetic field 10 induces a current in coil 4, which is substantially proportional to the length of the current path measured from at or adjacent the top of the coil 4, to a point substantially midway, or half way, down the depth of liquid in which the coil 4 is immersed in the liquid. In the present form of the invention this is the coil 4 as immersed in the milk 11 in the container 1. However, as will be appreciated, the invention has equal application to the measurement of other liquids, (not necessarily in containers). For example the depth of rivers, harbours and the like.

The longitudinal windings 5 of the coil 4 are particularly advantageous, in that they form or create a spacing or gap between the windings 5, which allows for the electro-magnetic field 10 to pass therethrough, and to thus be picked up by the coil 4 so as to be induced in the coil. This then provides for an effective electro-magnetic field which is capable of being read and converted into current which is a linear function of the electromagnetic field. As will be appreciated from the accompanying drawings, the longitudinal axis of the spacing or gap between the windings 5 (being in the form of the web 7 of the former 6 in the preferred form of the invention), is at substantially right angles to the substantially horizontal axis or plane of the electro-magnetic field 10 so that the electro-magnetic field is able to pass through the space or gap (such as in the direction of arrow 9 in FIG. 2 of the drawings.

In comparison, if the windings were substantially transverse or lateral, extending about a former, no such space or gap would be provided for the electro-magnetic field to pass through. Thus, there would not be an effective pick up and induction of the electro-magnetic field, by the coil.

While the first and second electrodes 2, 3, in the present form of the invention (and the coil 4 located within the second electrode 3) are substantially co-axial, or parallel one to the other, this is not essential. It is however advantageous that the axes of the first electrode and elongate coil are not substantially at right angles one to the other. For example, if the longitudinal axis of the alternating current passing down the first electrode 2 was at right angles to the longitudinal axes of the longitudinal windings 5 of the coil 4, a further electro-magnetic field might be formed to the detriment of the operation of the apparatus of the present invention.

In the present invention, if the conductivity of the milk is substantially uniform throughout, current flow at all times within the container or chamber should be substantially uniform.

In order to maintain a relatively uniform and regular operation, the dimensions of the former 6 and web 7 of the former 6, about which the windings 5 pass, should be substantially uniform. Such uniform dimensions will allow for effective use of the induced magnetic force as a linear function of liquid depth within the container. If there are variations in the form or dimension of the former 6 these can be calibrated out and allowed for in the electronic calculations to be taken into account in a final read out, (as to be described hereinafter). However, it is desirable that the dimensions of the former be substantially uniform, as to allow for an accurate reading when using the induced electro-magnetic force as a linear function of the liquid depth of milk within the container.

In the present invention where for example the material of the electrodes 2, 3, is stainless steel, and the electrically conductive liquid is milk, operating frequencies should be chosen so that they are compatible with milk and stainless steel, such that the materials do not create a barrier to the induced electro-magnetic field.

In this regard, it has been found that a frequency that is particularly suitable, is a frequency in the range of 3–30 KHz.

Referring now to the invention with particular regard to its use, and the method of measuring liquid within the container 1. See FIG. 1.

The measuring arrangement includes the container 1 which is associated for example with a milk meter such as that described in U.S. Pat. No. 3,349,617. First and second electrodes 2, 3, extend into the container 1, so as to be at least partially immersed in milk 11 within the container. The first and second electrodes 2, 3, are held or maintained in juxtaposition, adjacent one another, by upper and lower end stop members 8a thus forming a transducer unit 8. The first electrode 2 is preferably an elongate rod or tube, while the second electrode is an elongate hollow tube 3, both the first and second electrodes being constructed of a stainless steel material. A coil 4 is provided and located within the second electrode 3. The coil 4 includes a plurality of elongate and longitudinal windings 5 passing about a former 6. The former 6 and windings 5 are located and sealed within the second electrode 3. In use and location therefore, the longitudinal axes of the windings 5 are located in a substantially vertical orientation. The longitudinal axes of the first and second electrodes are also substantially vertical in one preferred form of the invention.

Figure 5:
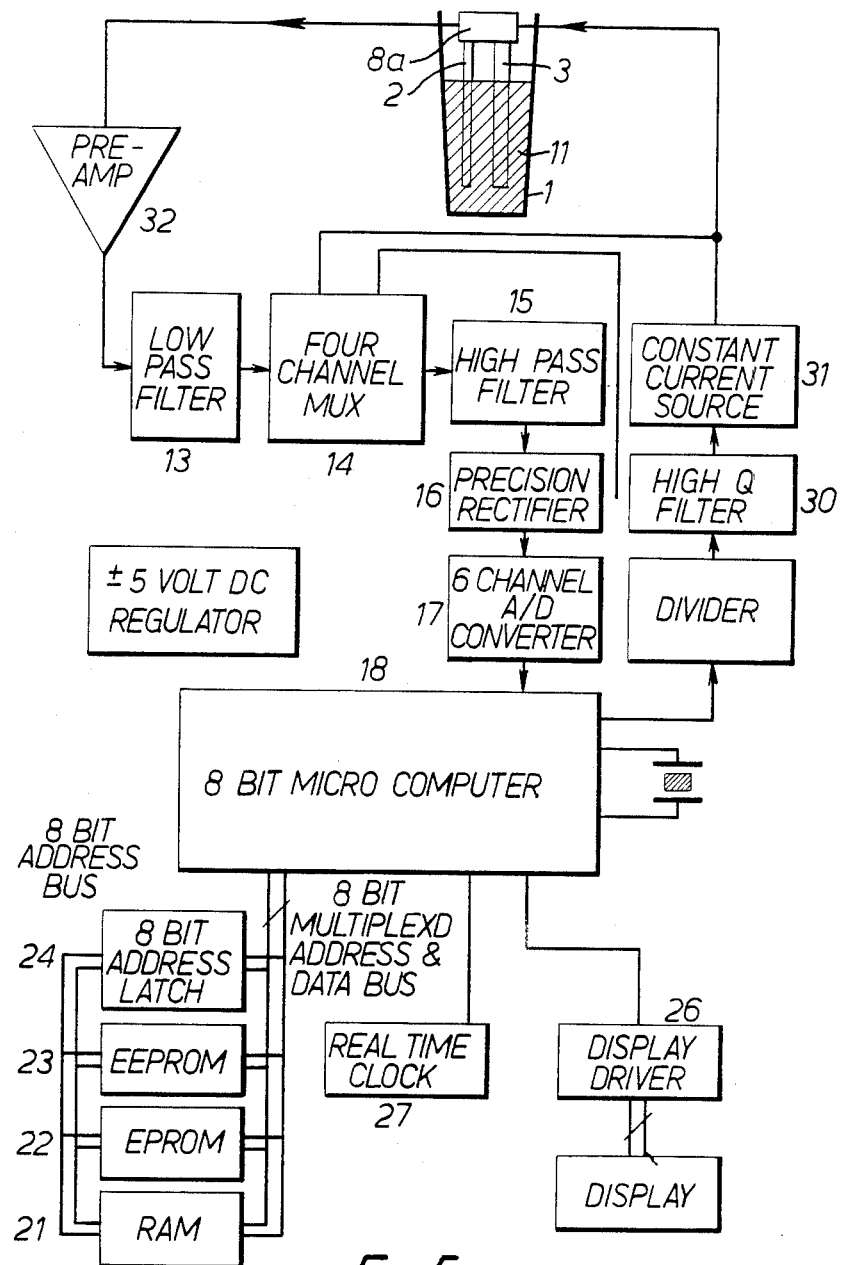
FIG. 5: is a diagrammatic flow sheet showing the operation of one form of the invention.

Referring to FIG. 5 of the accompanying drawings, a clock signal from a micro processor 18 is divided down into a suitable frequency passed through a high Q filter 30 and then into a constant current source 31. An alternating current therefore passes down the first electrode 2, through the milk 11 (being the electrically conductive liquid) and through the second electrode 3.

The passage of the alternating current creates an electro-magnetic force 10 about the first electrode 2, (such as shown in FIG. 1 of the drawings).

The electro-magnetic force 10 is picked up by and a current induced into the coil 4.

The induced current from the electro-magnetic force from the coil 4 is passed through a pre-amplifier 32, followed by a low-pass filter with gain 13. The signal is then high pass filtered as at 15, precision rectified as at 16 and then digitised by way of an analogue to a digital converter 17. Signal voltages from the constant current source, oscillator and pick-up coil are controlled from a micro-processor 18, by way of, for example, a four channel multi-plexer 14. These signals are then used to achieve a ratio measurement of the induced electro-magnetic force. The basic signal from the precision rectifier can also be used as a means of determining liquid height within the container. This signal is linear with change in height of the liquid.

By way of example, an 8 bit micro-computer unit 18 provides the control for the analogue signals and liquid crystal display. A real time clock 27 is provided to enable powering down of non-essential circuitory, calculation of flow rate information and for example automatic switch-off (after for example a predetermined period of twenty minutes of non-use).

The lower eight bits of the address bus are decoded by way of an 8 bit address latch 24. A memory mapped-technique can be used to decode RAM 21, EPROM 22, EEPROM 23, four channel MUX 14 and a display driver 26.

Analogue to digital conversion can be achieved by way of a six channel single slope 8–10 bit analogue to digital converter.

The micro-computer provides the addressing, timing, counting and arithmetical operations required for implementing a full analogue to digital converter system.

Appropriate software is used to convert the digitised transducer signal into for example milk yield such as kilograms, pounds and liters. In addition, from the data available, other information can be obtained such as milk conductivity, flow rate and ratio metric measurement of liquid height can be calculated. Appropriate software is also used for calibration of the system, where calibration at scaling factors are calculated and stored in the EEPROM 23.

The means whereby the electro-magnetic force is converted and read, into for example the linear function of the electrically conducted liquid is by way of example only.

It will be appreciated that any appropriate means can be used for reading and converting the current induced by the electro-magnetic field into the linear function of depth of the electrically conductive liquid.

In use, the electro-magnetic field induced current in the coil 4 is substantially proportional to the length of the current path measured from adjacent the top of the coil to a point substantially midway, or half way, down the length of depth of liquid in which the coil 4 is immersed in the liquid. In the present form of the invention this is the coil 4 as immersed in the milk 11 in the container 1. However, as will be appreciated, the invention has equal application to the measurement of other liquids, (not necessarily in containers). For example the depth of rivers, harbours and the like.

Referring now to use of the present invention, we refer again to FIG. 1 of the drawings.

An approximate solution for the sensitivity of the probe can be readily derived by neglecting end effects. The magnetic field r meters from a long current carrying wire is $$B = \frac{2 \cdot I}{r} \cdot 10^{-7}$$

If the coil width W is small compared with r, the emf in the coil by this field is $$e = B \, A \, N \, w$$

where A=coil area, N=number of turns, and w=angular frequency.

Since the coil area $A = L \times W$, the emf (electro-magnetic force) is $$e = \frac{2 \cdot I}{r} L \cdot W \cdot N \cdot w \cdot 10^{-7} \text{ volts.}$$

The electrode may be regarded as a mutual inductor, having a maximum mutual inductance of $$M = \frac{0.2 \cdot L \cdot W \cdot N}{r} \text{ microhenries}$$

The induced emf is then
$e = w \cdot M \cdot I$ volts.

VARIABLE CONDUCTIVITY OF THE LIQUID

Electrode operation is unaffected by the liquid conductivity provided the conductivity is uniform throughout the container. In practice this cannot be assumed.

With for example milk the conductivity tends to reduce as the milking cycle proceeds due to the increasing fat content of the later milk. The reduction from the initial value ranges typically from 10% to 20% and could in the worst case amount to 25%.

The general expression for the emf in the coil due to electrode current I is $$e = I \cdot b \left( L_o - \frac{\int_0^h x \sigma_x \, dx}{\int_0^h \sigma_x \, dx} \right)$$

whereby b is a constant, $L_o$ is the effective length of the electrodes, h is the height of the milk surface above the bottom o of the container, and $\sigma_x$ is the conductivity of the milk at height x above the bottom of the container.

Solutions for three simple conductivity profiles are:

Uniform conductivity $$e = I \cdot b \left( L_o - \frac{h}{2} \right)$$

Stepped conductivity decrease

If the conductivity is uniform to height h/2, at which point it decreases suddenly to a value $(1-\alpha)$ times the initial value, and is thereafter constant, the solution is $$e = I \cdot b \left( L_o - \frac{h}{2} \cdot \frac{1 - \frac{3\alpha}{4}}{1 - \frac{\alpha}{2}} \right)$$

If $\alpha$ is small the error is approximately $\alpha/4$

If the decrease is 30% the error using the approximate solution is 7.5% while the exact solution gives 8.8%.

Linear conductivity decrease

Suppose the conductivity decreases linearly to height h, such that the value at h is $(1-\alpha)$ times the value at the bottom. In this case $$e = I \cdot b \left( L_o - \frac{h}{2} \cdot \frac{1 - \frac{2}{3} \cdot \alpha}{1 - \frac{1}{2} \cdot \alpha} \right)$$

If $\alpha$ is small the error is approximately $\alpha/6$

If the conductivity decrease is 30%, the error is 5% using the approximate solution, or 5.9% using the exact solution.

This invention has been described by way of example only, and it should be appreciated that modifications and improvements can be made to the invention without departing from the scope or spirit thereof, as defined by the appended claims.

We claim:
1. A liquid level measuring arrangement comprising:
   at least first and second spaced apart electrodes;
   at least one elongate electrical coil;
   said electrodes and said coil being adapted to be at least partially immersed in an electrically conductive liquid;
   means being provided to pass an alternating current through and between said first and second electrodes, by way of said electrically conductive liquid, so as to create an electro-magnetic field about at least said first electrode;

said elongate coil being shaped and located so that said electro-magnetic field induces a current in said coil;

means being provided to convert said electro-magnetic field into a substantially linear function of the depth of said electrically conductive liquid.

2. An arrangement as claimed in claim 1, wherein the coil includes one or more longitudinal windings.

3. An arrangement as claimed in claim 1 wherein the coil includes one or more longitudinal windings, said coil being located within an elongate housing forming said second electrode.

4. An arrangement as claimed in claim 1, wherein the first electrode is an elongate rod or tube.

5. An arrangement as claimed in claim 1, wherein said electrodes are formed of a stainless steel material.

6. An arrangement as claimed in claim 1, wherein the elongate coil includes one or more elongate windings passing about an elongate former.

7. An arrangement as claimed in claim 1, wherein the electro-magnetic field induces a current in said coil, being substantially proportional to the length of current path measured from the top of said coil to a point substantially midway down the depth of said liquid.

8. An arrangement as claimed in claim 1, wherein the electrically conductive liquid is milk.

9. An arrangement as claimed in claim 1, wherein the electrodes and coil are connected together to form a transducer unit.

10. An arrangement as claimed in claim 1, wherein the coil includes one or more longitudinal windings; the longitudinal axes of said one or more longitudinal windings being at substantially right angles to the plane of the electro-magnetic field created about said first electrode.

11. A method of measuring liquid level including:

at least partially immersing first and second electrodes and at least one elongate electrical coil, into an electrically conductive liquid;

passing an alternating current through said first and second electrodes by way of said liquid, so as to create an electro-magnetic field about at least said first electrode, said elongate coil being shaped and located so that said electro-magnetic field induces a current in said coil;

converting said electro-magnetic field into a substantially linear function of the depth of said electrically conductive liquid.

12. A method as claimed in claim 11, wherein the current induced in said coil is substantially proportional to the length of current path measured from the top of said coil to a point substantially on the coil midway down the depth of said liquid in which said coil is immersed.

13. A method as claimed in claim 11, wherein said electrodes and coil are at least partially immersed in milk within a container.

14. A method as claimed in claim 11, wherein the electrically conductive liquid is milk.

15. A method as claimed in claim 11, wherein said coil includes one or more longitudinal windings.

16. A method as claimed in claim 11, wherein the coil includes one or more longitudinal windings; the longitudinal axes of said one or more windings being at substantially right angles to the plane of the electro-magnetic field created about said first electrode.

* * * * *